(12) United States Patent
Kikuchi

(10) Patent No.: US 10,040,409 B2
(45) Date of Patent: Aug. 7, 2018

(54) WIRE HARNESS

(71) Applicant: YAZAKI CORPORATION, Tokyo (JP)

(72) Inventor: Hideaki Kikuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 151 days.

(21) Appl. No.: 15/201,199

(22) Filed: Jul. 1, 2016

(65) Prior Publication Data

US 2017/0008466 A1    Jan. 12, 2017

(30) Foreign Application Priority Data

Jul. 8, 2015    (JP) ................................. 2015-136900

(51) Int. Cl.
*B60L 1/00* (2006.01)
*B60R 16/03* (2006.01)
*B60R 16/02* (2006.01)

(52) U.S. Cl.
CPC .......... *B60R 16/03* (2013.01); *B60R 16/0207* (2013.01)

(58) Field of Classification Search
CPC ............................. B60R 16/0207; B60R 16/03
See application file for complete search history.

(56) References Cited

U.S. PATENT DOCUMENTS

2002/0028600 A1* 3/2002 Kondo ................ B60R 16/0207
439/502
2015/0349471 A1* 12/2015 Maki .................. H01R 13/6691
307/10.1

FOREIGN PATENT DOCUMENTS

| JP | 8-50825 A | 2/1996 |
| JP | 2001-319525 A | 11/2001 |
| JP | 2003-237499 A | 8/2003 |

OTHER PUBLICATIONS

Japanese Office Action for the related Japanese Patent Application No. 2015-136900 dated Jul. 4, 2017.

* cited by examiner

*Primary Examiner* — Jared Fureman
*Assistant Examiner* — Duc M Pham
(74) *Attorney, Agent, or Firm* — Kenealy Vaidya LLP

(57) ABSTRACT

A wire harness includes a trunk line which serves as a transmission line of power from a vehicle battery; and a plurality of power source control boxes which are provided on the trunk line, arranged one by one in each of a plurality of partitions into which a vehicle is partitioned, and distribute the power received through the trunk line to a power-demanding device that demands for supply of power. In at least one partition of the plurality of partitions, the power source control box of the corresponding partition is connected with entire first device arranged in the same partition to supply power among the first device and a second device, and includes a connection unit of a branch wire which is connected to a sub-power source control box that supplies power to the second device.

7 Claims, 5 Drawing Sheets

FIG.4

| FACILITY COMPARISON LIST | | ● … STANDARD FACILITY<br>△ … OPTIONAL FACILITY OR FACILITY SET IN HIGH GRADE | | | | |
|---|---|---|---|---|---|---|
| | VEHICLE MANUFACTURER | | TOYOTA | NISSAN | HONDA | MAZDA |
| | VEHICLE TYPE (VEHICLE NAME) | | VITZ | NOTE | FIT | DEMIO |
| FACILITY | IMPROVEMENT IN FUEL ECONOMY | IDLE STOP | △ | ● | - | △ |
| | DRIVING SUPPORT | CRUISE CONTROL | - | - | △ | - |
| | | BACK MONITOR | △ | △ | - | - |
| | | AROUND VIEW MONITOR | - | △ | - | - |
| | LAMP | LED HEAD LAMP | △ | - | - | △ |
| | | DISCHARGE HEAD LAMP | ● | ● | ● | ● |
| | | HALOGEN HEAD LAMP | △ | - | △ | △ |
| | | AUTO HEAD LIGHT | △ | - | △ | - |
| | | AUTO LEVELING | - | - | - | - |
| | | AFS | - | △ | - | △ |
| | | AUTO HIGH BEAM | △ | - | △ | - |
| | | FRONT FOG LAMP | - | ● | - | ● |
| | | LED FRONT FOG | ● | - | △ | - |
| | | LED HIGH MOUNT STOP LAMP | ● | ● | ● | - |
| | | LED TAIL LAMP | - | - | - | - |
| | | EMERGENCY BRAKE SIGNAL | △ | ● | ● | △ |
| | SECURITY | IMMOBILIZER | △ | ● | ● | △ |
| | | SMART KEY SYSTEM | - | - | - | - |
| | | ALARM SYSTEM | - | - | - | - |
| | INTERIOR | AUTO ANTI-GLARE REAR VIEW MIRROR | ● | - | - | - |
| | | LAMP-ATTACHED VANITY MIRROR | - | - | - | - |
| | AUDIO | TOUCH SCREEN HEAD UNIT | △ | - | - | - |
| | | AMBIENT LAMP | - | - | - | - |
| | | STEERING SWITCH | - | - | △ | ● |
| | | VOICEINPUT SYSTEM | - | - | - | - |
| | | iPod CONNECTION DEVICE | - | - | △ | - |

FIG.5

FACILITY COMPARISON LIST
● ··· STANDARD FACILITY
△ ··· OPTIONAL FACILITY OR FACILITY SET IN HIGH GRADE

| | VEHICLE MANUFACTURER | | TOYOTA | TOYOTA |
|---|---|---|---|---|
| | VEHICLE TYPE (VEHICLE NAME) | | AQUA | VITZ |
| FACILITY | IMPROVEMENT IN FUEL ECONOMY | IDLE STOP | ● | △ |
| | | BRAKE REGENERATION | ● | — |
| | | HYBRID | ● | — |
| | | EV | — | — |
| | BRAKE/POSTURE CONTROL | ALUMINUM BODY | — | — |
| | | ABS | ● | ● |
| | | BRAKE ASSIST | ● | ● |
| | | TRC | ● | △ |
| | | VDC/VSA/ASC/VSC | ● | △ |
| | | MOTOR POWER STEERING | ● | ● |
| | | MOTOR PARKING BRAKE | — | — |
| | | ACTIVE STABILIZER | — | — |
| | | AIR SUSPENSION | — | — |

WIRE HARNESS

CROSS-REFERENCE TO RELATED APPLICATION(S)

The present application claims priority to and incorporates by reference the entire contents of Japanese Patent Application No. 2015-136900 filed in Japan on Jul. 8, 2015.

BACKGROUND OF THE INVENTION

1. Field of the Invention

The present invention relates to a wire harness.

2. Description of the Related Art

In general, a wire harness is provided in a vehicle in order to supply power from a vehicle battery. Such a wire harness is produced differently depending on specification of a vehicle and the like (see Japanese Patent Application Laid-open No. 8-50825).

Conventional wire harnesses are changed entirely according to the specification of the vehicle and the like, and thus, include various types. Thus, it is considered to achieve the communization of some electric wires. However, although there is an electric wire which is necessarily used regardless of the specification and the like in a part of the wire harness, it is necessary to form a connection part with another electric wire by processing the electric wire in a case in which there is a device according to the specification, and the connection part is not necessarily formed in a case in which there is no device according to the specification, and eventually, even the electric wire which is necessarily used is hardly provided as a common component in all the specifications depending on the presence or absence of the connection part.

Thus, it is considered that the entire connection part is formed in advance in the electric wire which is necessarily used, but a conductor portion of the connection part is exposed in such a case, which may cause a short circuit. That is, the electric wire has flexibility, and thus, there is a case in which a location of the conductor portion of the connection part is moved, for example, by vibration of the vehicle so that the conductor portion is in contact with a vehicle body and the like, and is short-circuited.

SUMMARY OF THE INVENTION

The present invention has been made in order to solve such a problem, and an objective thereof is to provide a wire harness which includes a common component while reducing the possibility of the short circuit.

According to one aspect of the present invention, a wire harness includes a trunk line which serves as a transmission line of power from a vehicle battery; and a plurality of power source control boxes which are provided on the trunk line, arranged one by one in each of a plurality of partitions into which a vehicle is partitioned, and configured to distribute the power received through the trunk line to a power-demanding device that demands for supply of power, wherein in at least one partition of the plurality of partitions, the power source control box of the corresponding partition is connected with entire first device arranged in the same partition to supply power among the first device and a second device, and includes a connection unit of a branch wire which is connected to a sub-power source control box that supplies power to the second device.

According to another aspect of the present invention, in the wire harness, the first device may be a device mounted in all grades of a specific vehicle type, and the second device may be a device mounted in a grade higher than a lowest grade or mounted optionally.

According to still another aspect of the present invention, in the wire harness, the first device may be a device mounted in all vehicle types in a same segment, and the second device may be a device mounted in any of the vehicle types in the same segment.

According to still another aspect of the present invention, in the wire harness, the first device may be a device mounted in all vehicle types in a same platform of a same vehicle manufacturer, and the second device may be a device mounted in any of the vehicle types in the same platform of the same vehicle manufacturer.

According to still another aspect of the present invention, in the wire harness, the first device may be a device mounted in all vehicle types of a same vehicle manufacturer, and the second device may be a device mounted in any of the vehicle types of the same vehicle manufacturer.

According to still another aspect of the present invention, in the wire harness, the first device may be a device mounted in all vehicle types in a specific group when a plurality of platforms of a same vehicle manufacturer are grouped into two or more groups, and the second device may be a device mounted in any of the vehicle types in the specific group.

According to the wire harness, in at least one partition of the plurality of partitions, the power source control box of the corresponding partition is connected with all the first devices arranged in the same partition to supply power thereto, and includes the connection unit of the branch wire which is connected to the sub-power source control box that supplies power to the second device. Thus, the power source control box of the partition supplies power to the first device which is commonly mounted, and the power reaches the sub-power source control box from the connection unit of the branch wire through the branch wire and is supplied to the second device through the sub-power source control box. Accordingly, the connection unit of the branch wire is not connected with the branch wire in a case in which the second device is not mounted in the partition, the configuration of the sub-power source control box may be changed depending on the grade and the like in a case in which the second device is mounted therein, and the power source control box of the partition is commonized.

Further, since the connection unit is provided in the power source control box, the connection unit is provided not in a flexible component such as an electric wire, but in a component such as a casing which is called a box, and accordingly, a possibility that the component is bent, for example, by the vibration of the vehicle so that the connection unit contacts a vehicle body and the like is reduced.

Therefore, it is possible to provide the wire harness which includes the common component by commonizing the power source control box while reducing the possibility of the short circuit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table for describing a first device and a second device according to a second embodiment; and FIG. 5 is a table for describing a first device and a second device according to a third embodiment.

DETAILED DESCRIPTION OF THE PREFERRED EMBODIMENTS

Hereinafter, the present invention will be described with preferred embodiments. Incidentally, the present invention is not limited to the embodiments to be described below, and can be appropriately modified within a range without departing from a gist of the present invention. In addition, although there are parts where some configurations are not illustrated and described in the embodiments to be described below, it is obvious that known or well-known techniques are appropriately applied regarding the detail of the omitted techniques within a range without any inconsistency with the content to be described below.

Figure 1:
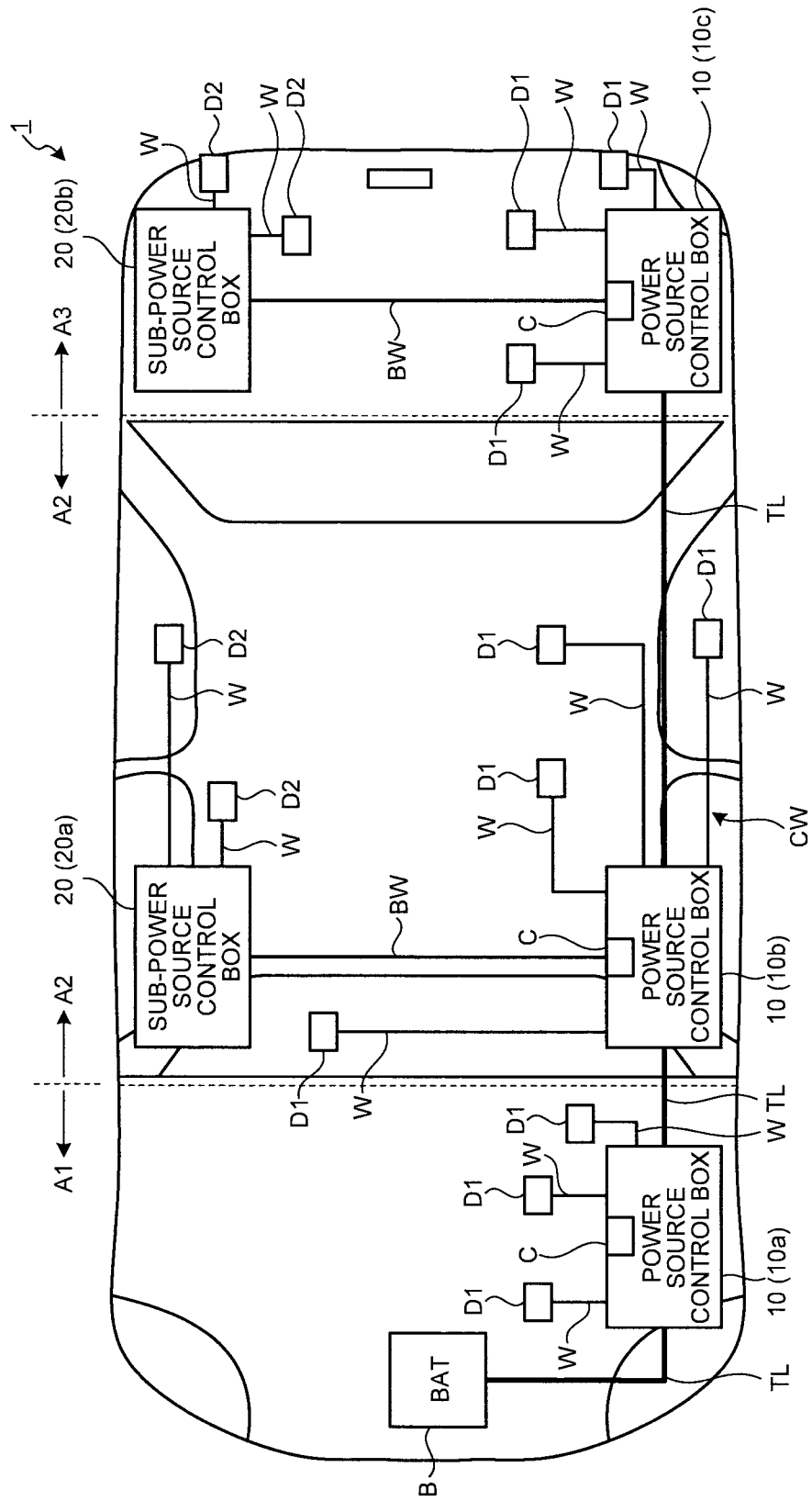
FIG. 1 is a schematic configuration diagram of a wire harness according to a first embodiment.

FIG. 1 is a schematic configuration diagram of a wire harness 1 according to a first embodiment. As illustrated in FIG. 1, the wire harness 1 according to the first embodiment is provided in a vehicle and supplies power to a plurality of power-demanding devices which demand for the supply of power. In this embodiment, a first device D1 and a second device D2 are provided as the plurality of power-demanding devices. The first device D1 is a device to be mounted in all grades of a specific vehicle type (a vehicle having a specific vehicle name), and an example thereof is a traveling motor in a hybrid car. On the other hand, the second device D2 is a device to be mounted in a grade higher than the lowest grade of the specific vehicle type or to be optionally mounted, and an example thereof is a back monitor and an emergency notification device. The wire harness 1 according to the first embodiment supplies power to the first device D1 and the second device D2 described above.

The wire harness 1 according to this embodiment is configured of a common wire harness CW, a branch wire BW, a sub-power source control box 20, and the like. The common wire harness CW includes a trunk line TL, and a plurality of power source control boxes 10.

The trunk line TL is, for example, a thick electric wire serving as a transmission line of power from a vehicle battery B. The plurality of power source control boxes 10 are provided on the trunk line TL, and distribute the power received through the trunk line TL to the plurality of power-demanding devices. In addition, the vehicle is partitioned to three (a plurality of) partitions A1 to A3, which are rectangular when seen from the top, and the power source control boxes 10 are arranged one by one in each partition in this embodiment.

When the description is given in detail, a first power source control box 10a is arranged in the front partition A1, a second power source control box 10b is arranged in the center partition A2, and a third power source control box 10c is arranged in the rear partition A3. Herein, the vehicle battery B is mounted in the front partition A1, and the vehicle battery B and the first power source control box 10a are connected by the trunk line TL. In addition, the trunk line TL is provided between the first power source control box 10a and the second power source control box 10b, and between the second power source control box 10b and the third power source control box 10c, and connects those power source control boxes. Accordingly, the power from the vehicle battery B is supplied to each of the power source control boxes 10.

Incidentally, in the following description, reference numeral 10 will be assigned when the plurality of power source control boxes 10 are indicated as a whole or any one of the plurality of power source control boxes 10 is not specified, and reference numerals 10a to 10c will be assigned when any one thereof is specified. Similarly, reference numeral 20 will be assigned when the entire sub-power source control box 20 is indicated or any one of the sub-power source control boxes 20 is not specified, and reference numerals 20a and 20b will be assigned when any one thereof is specified.

Each of the power source control boxes 10a to 10c is connected to all the first devices D1, arranged in the same one of the partitions A1 to A3 through individual electric wires W. Thus, each of the power source control boxes 10a to 10c supplies power to all the first devices D1 arranged in the same one of the partitions A1 to A3. When the description is given in detail, the front partition A1 is provided with the three first devices D1, and the first power source control box 10a distributes power to the three first devices D1 in the example illustrated in FIG. 1. In addition, the center partition A2 is provided with the four first devices D1, and the second power source control box 10b distributes power to the four first devices D1. Further, the rear partition A3 is provided with the three first devices D1, and the third power source control box 10c distributes power to the three first devices D1. Incidentally, the number of the first devices D1 in each of the partitions A1 to A3 is not limited to be plural, but may be one.

Further, each of the power source control boxes 10a to 10c is provided with a connection unit C to which one end of the branch wire BW is connected. The connection unit C may be formed using a connector or may be, for example, a bolted portion to which an LA terminal or the like is connected. Particularly, it is preferable that an electrical connection part (a metal portion such as a terminal) in the connection unit C be covered by a hood or be arranged inside a casing to form the box 10 so that the metal portion is less likely to contact a worker that mounts the boxes 10. In addition, the other end of the branch wire BW is connected with the sub-power source control box 20. The sub-power source control box 20 is configured to distribute power to all the second devices D2 arranged in the same one of the partitions A1 to A3. The sub-power source control box 20 is connected to the second devices D2 via the respective individual electric wires W. Thus, the power from the vehicle battery B reaches the sub-power source control box 20 through the trunk line TL, the power source control box 10 and the branch wire BW, and is supplied from the sub-power source control box 20 to the second device D2 through the individual electric wire W.

The description will be given in more detail. First, the second device D2 may not be present in the partitions A1 to A3 depending on a grade or option of the specific vehicle type. In the example illustrated in FIG. 1, the second device D2 is not present in the first partition A1. Thus, the branch wire BW is not connected to the connection unit C of the first power source control box 10a in this partition A1, and the sub-power source control box 20 is not provided, either.

On the other hand, the second devices D2 are provided in the partitions A2 and A3 depending on the grade and the option of the vehicle. Thus, the partitions A2 and A3 are provided with the branch wires BW and the sub-power source control boxes 20 in order to distribute the power to the second devices D2. When the description is given in detail, the center partition A2 is provided with the first sub-power source control box 20a, which is connected to the second power source control box 10b through the branch wire BW. In addition, the rear partition A3 is provided with the second sub-power source control box 20b, which is connected to the third power source control box 10c through the branch wire BW. Further, the two second devices D2 are connected to the first and second sub-power source control boxes 20a and 20b, respectively, and the power is supplied to the two second devices D2 by the first and second sub-power source control boxes 20a and 20b.

The common wire harness CW is set as a common component in the above-described wire harness 1. That is, although vehicles are different in grade or include optional devices, the common wire harness CW is used without any change.

Figure 2:
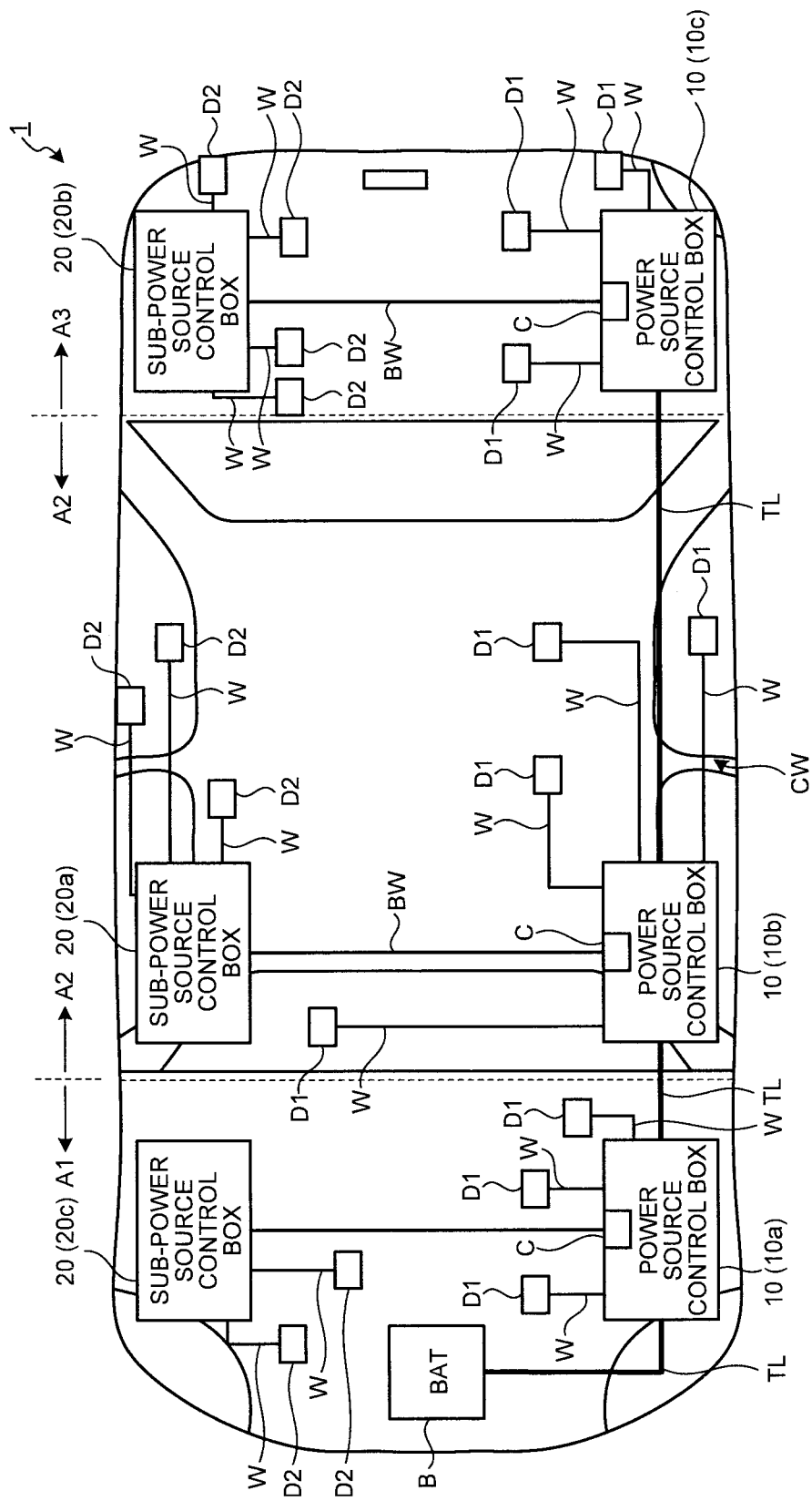
FIG. 2 is a schematic configuration diagram illustrating another example of the wire harness.

FIG. 2 is a schematic configuration diagram illustrating another example of the wire harness 1. The vehicle having a grade higher than the example illustrated in FIG. 1 is exemplarily illustrated in FIG. 2.

Since the vehicle illustrated in FIG. 2 has a higher grade than that illustrated in FIG. 1, the second device D2 is added in each of the partitions A1 to A3. Accordingly, the first sub-power source control box 20a distributes power to, for example, the three second devices D2, and the second sub-power source control box 20b distributes power to, for example, the four second devices D2.

Further, the connection unit C of the first power source control box 10a is connected with one end of the branch wire BW in order to supply power to the second device D2 added to the front partition A1, and a third sub-power source control box 20c is connected to the other end of the branch wire BW. Further, the third sub-power source control box 20c is connected with the two second devices D2 through the individual electric wires W, and the power is supplied to the two second devices D2 through the trunk line TL, the first power source control box 10a, the branch wire BW, the third sub-power source control box 20c, and the individual electric wire W.

Herein, the trunk line TL and the power source control box 10 have no change in configuration, which is apparent when comparing the wire harnesses 1 illustrated in FIGS. 1 and 2. That is, it is possible to say that the commonization is achieved regarding the common wire harness CW in this embodiment. Incidentally, the number of the second devices D2, which are connected to the first and second sub-power source control boxes 20a and 20b, is large, and thus, the sub-power source control boxes are changed in configuration, but the commonization may be achieved regarding the sub-power source control box 20 if possible.

Figure 3:
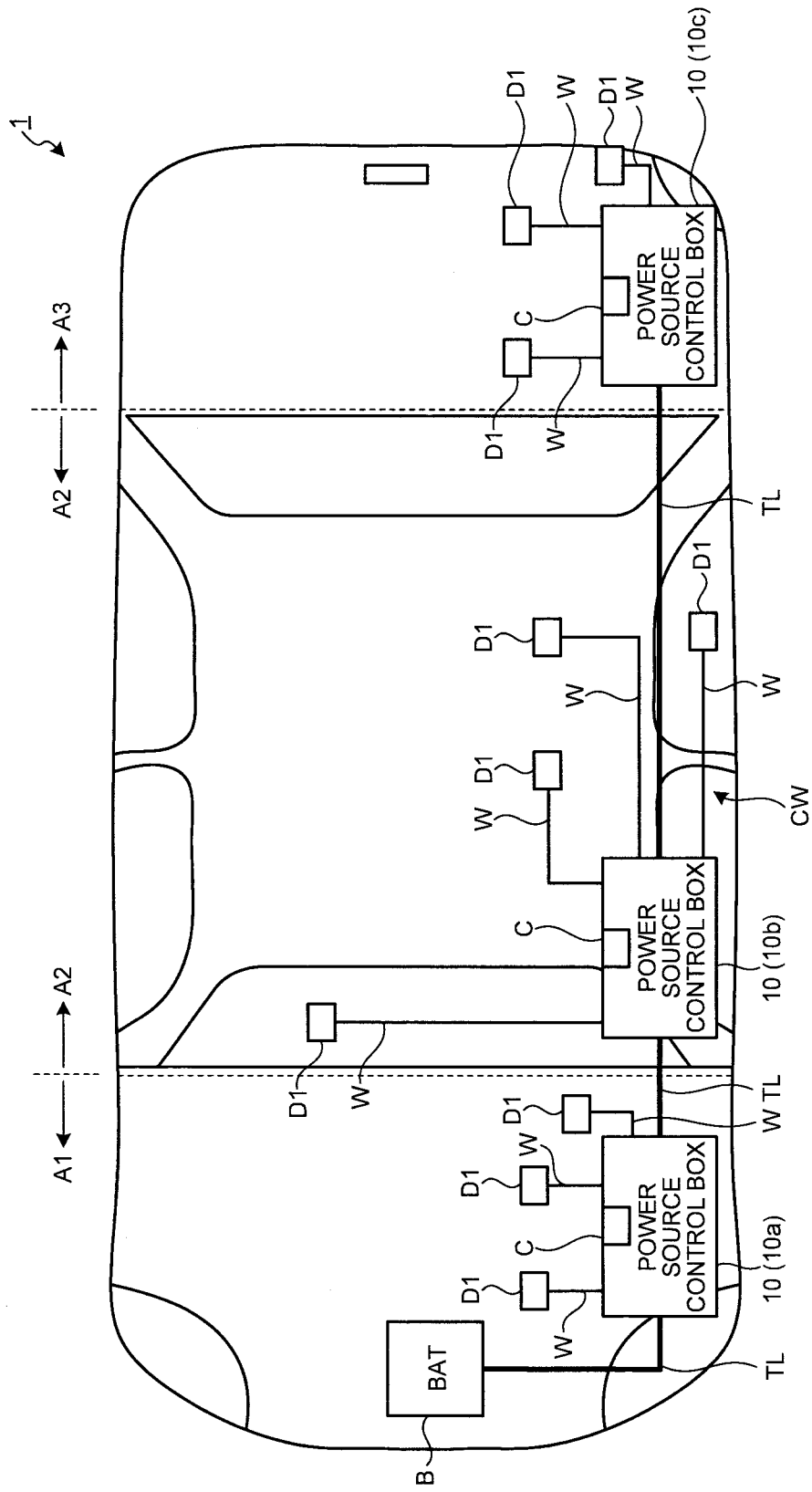
FIG. 3 is a schematic configuration diagram illustrating still another example of the wire harness.

FIG. 3 is a schematic configuration diagram illustrating still another example of the wire harness 1. The wire harness has a configuration as illustrated in FIG. 3 in the case of the lowest grade without any option in the specific vehicle type, for example.

Since the vehicle illustrated in FIG. 3 is in the lowest grade without any option, the partitions A1 to A3 are not provided with the second device D2 at all. Thus, the partitions A1 to A3 are not provided with the sub-power source control box 20 and the branch wire BW.

However, the trunk line TL and the power source control box 10 have no change in configuration, which is apparent when comparing the wire harnesses 1 illustrated in FIGS. 1 and 3. That is, it is possible to say that the commonization is achieved regarding the common wire harness CW in this embodiment.

In this manner, the power source control box 10 is connected with all the first devices D1 arranged in the same one of the partitions A1 to A3 to supply power, and has the connection unit C of the branch wire BW to be connected to the sub-power source control box 20 that supplies power to the second device D2 in the plurality of the partitions A1 to A3 of the wire harness 1 according to the first embodiment. Thus, the power source control box 10 of each of the partitions A1 to A3 supplies power to the first device D1, which is commonly mounted, and the power reaches the sub-power source control box 20 from the connection unit C of the branch wire BW through the branch wire BW and is supplied to the second device D2 through the sub-power source control box 20. Accordingly, the connection unit C of the branch wire BW is not connected with the branch wire BW in a case in which the second device D2 is not mounted in each of the partitions A1 to A3, and the configuration of the sub-power source control box 20 may be changed depending on the grade and the like in a case in which the second device D2 is mounted therein, whereby the power source control box 10 of each of the partitions A1 to A3 is commonized.

Further, since the power source control box 10 is provided with the connection unit C, the connection unit C is provided not in a flexible component such as an electric wire, but in a component such as a casing which is called a box, thereby reducing a possibility that the connection unit C is bent, for example, by vibration of the vehicle to be in contact with a vehicle body and the like.

Therefore, it is possible to provide the wire harness 1 which includes the common component by commonizing the power source control box 10 while reducing a possibility of a short circuit.

Particularly, since the power source control box 10 is connected with all the first devices D1 arranged in the same one of the partitions A1 to A3 to supply power and has the connection unit C of the branch wire BW in all of the plurality of the partitions A1 to A3, the power source control box 10 of all the partitions A1 to A3 is commonized, and further, the trunk line TL also is commonized so that the number of the common component can be further increased.

Next, a second embodiment of the present invention will be described. A wire harness 1 according to the second embodiment is similar to that in the first embodiment, but has a partial difference in configuration. Hereinafter, a point different from the first embodiment will be described.

The concept of a first device D1 and a second device D2 is different from that of the first embodiment in the wire harness 1 according to the second embodiment. That is, in the second embodiment, the first device D1 is a device which is mounted in all the vehicle types in the same segment (the vehicle type is a vehicle classified based on the vehicle name) and the second device D2 is a device which is mounted in at least any one (except for the case of all the vehicle types) of the vehicle types in the same segment. Herein, the device, which is mounted in all the vehicle types in the same segment, is a device which is mounted in all the vehicle types in the case of the lowest grade without any option in all the vehicle types in the same segment. Herein, this point will be described in detail.

FIG. 4 is a table for describing the first device D1 and the second device D2 according to the second embodiment. Incidentally, FIG. 4 is obtained by partially extracting each standard facility of the vehicle types and the like. In addition, in FIG. 4, a device to which "∘" is assigned indicates the standard facility in the corresponding vehicle type (that is, the device mounted even in the lowest grade without any option), and a device to which "Δ" assigned is a device which is mounted in option or in the high grade.

First, the classification of Global Insight Corporation, the classification of Marketing System Inc., and the classification of the European Commission are known as the segment, and the segment in the second embodiment indicates one (particularly, the classification of the European Commission) among them.

In this classification of the European Commission, for example, Vitz (registered trademark) of Toyota (registered trademark), Note (registered trademark) of Nissan (registered trademark), FIT (registered trademark) of Honda (registered trademark), and Demio (registered trademark) of Mazda (registered trademark) all belong to a segment B. Herein, when the description is given assuming that the number of the vehicle types of the segment B is only four as described above, the first device D1 is a device to which "○" is assigned in all the vehicle types in the table illustrated in FIG. 4. That is, the first device D1 in the second embodiment corresponds to a halogen head lamp, for example. On the other hand, the second device D2 is a device to which "○" or "Δ" is assigned in any one of the vehicle types in the table illustrated in FIG. 4. That is, the second device D2 in the second embodiment corresponds to, for example, an idle stop, the back monitor, and the like.

When Vitz is exemplarily set as the specific vehicle type, the entire device to which "○" is assigned corresponds to the first device D1 and the entire device to which "Δ" is assigned corresponds to the second device D2 in the first embodiment, but, in the second embodiment, the concept of the first device D1 and the second device D2 is different from that of the first embodiment as described above.

Thus, a power source control box 10 according to the second embodiment distributes power to the first device D1 as illustrated in FIG. 4, and the power is supplied to the second device D2 through a branch wire BW and a sub-power source control box 20.

Accordingly, a common wire harness CW in the wire harness 1 is provided as the common component in the vehicle types of the same segment. That is, the common wire harness CW can be used without being changed as long as the segment is not different.

In this manner, it is possible to provide the wire harness 1 which includes the common component by commonizing the power source control box 10 while reducing the possibility of the short circuit according to the wire harness 1 of the second embodiment, which is similar to the first embodiment.

Next, a third embodiment of the present invention will be described. A wire harness 1 according to the third embodiment is similar to that in the first embodiment, but has a partial difference in configuration. Hereinafter, a point different from the first embodiment will be described.

The concept of a first device D1 and a second device D2 in the wire harness 1 according to the third embodiment is different from that of the first embodiment. That is, in the third embodiment, the first device D1 is a device which is mounted in all the vehicle types in the same platform of the same vehicle manufacturer, and the second device D2 is a device which is mounted in at least one (except for the case of all the vehicle types) of the vehicle types in the same platform of the same vehicle manufacturer. Herein, the device which is mounted in all the vehicle types in the same platform of the same vehicle manufacturer is a device which is mounted in all the vehicle types in the case of the lowest grade without any option in all the vehicle types in the same platform of the same vehicle manufacturer. Herein, this point will be described in detail.

FIG. 5 is a table for describing the first device D1 and the second device D2 according to the third embodiment. Incidentally, FIG. 5 is obtained by partially extracting the standard facility and the like of each vehicle type. In addition, a device to which "○" is assigned in FIG. 5 indicates the standard facility of the corresponding vehicle type (that is, the device which is mounted even in the case of the lowest grade without any option) and a device to which "Δ" is assigned indicates the device which is mounted in the case of the option or the high grade.

First, the platform is the classification of vehicles which is determined by each vehicle manufacturer, and, for example, Aqua (registered trademark) and Vitz of Toyota Motor Corporation belong to the same platform B. Here, when the description is given assuming that the number of the vehicle types in the platform B is two, the first device D1 is the device to which "○" is assigned in all the vehicle types in a table illustrated in FIG. 5. That is, the first device D1 corresponds to, for example, an ABS, a brake assist, and a motor power steering in the third embodiment. On the other hand, the second device D2 is the device to which "○" or "Δ" is assigned in any one of the vehicle types in the table illustrated in FIG. 5. That is, the second device D2 corresponds to, for example, the idle stop, a brake regeneration, a hybrid, a TRC, and VDC/VSA/ASC/VSC in the third embodiment.

When Vitz is exemplarily set as the specific vehicle type, the entire device to which "○" is assigned corresponds to the first device D1 and the entire device to which "Δ" is assigned corresponds to the second device D2 in the first embodiment, but, in the third embodiment, the concept of the first device D1 and the second device D2 is different from that of the first embodiment as described above.

Further, a power source control box 10 according to the third embodiment distributes power to the above-described first device D1, and the power is supplied to the second device D2 through a branch wire BW and a sub-power source control box 20.

Accordingly, a common wire harness CW in the wire harness 1 is provided as the common component in the vehicle types in the same platform of the same vehicle manufacturer. That is, the common wire harness CW can be used without being changed as long as the vehicle manufacturer and the platform are not different.

In this manner, it is possible to provide the wire harness 1 which includes the common component by commonizing the power source control box 10 while reducing the possibility of the short circuit according to the wire harness 1 of the third embodiment, which is similar to the first embodiment.

Although the present invention has been described above on the basis of the embodiments, the present invention is not limited to the above-described embodiments, but may be modified within a range without departing from the gist of the present invention or may be appropriately combined with another technique within an allowable range.

For example, the first device D1 and the second device D2 are not limited to those illustrated in the above-described first to third embodiments, and may be configured as follows. That is, the first device D1 may be a device which is mounted in all the vehicle types in the same vehicle manufacturer, and the second device D2 may be a device which is mounted in any one of the vehicle types in the same vehicle manufacturer. It is because it is possible to commonize the common wire harness CW in all the vehicle types in the vehicle manufacturer in this manner.

In addition, the first device D1 may be a device which is mounted in all the vehicle types in a specific group when a plurality of platforms of the same vehicle manufacturer are grouped into at least two groups, and the second device D2 may be a device which is mounted in any one of the vehicle types in the corresponding specific group. It is because it is possible to commonize the common wire harness CW in all the vehicle types in the specific group based on the platform of the vehicle manufacturer in this manner.

In addition, the number of the partition is three in the above description, but is not limited thereto, and the number of the partition may be two or four or more. Further, the power source control boxes 10 in all the partitions A1 to A3 are connected to all the first devices D1 arranged in the same one of the partitions A1 to A3 to supply power, and include the connection unit C of the branch wire BW in the above description. However, the configuration is not limited thereto, and the power source control boxes 10 may be connected to all the first devices D1 in at least one of the partitions A1 to A3 to supply power, and may include the connection unit C of the branch wire BW. It is because it is possible to commonize the power source control boxes 10 in at least one of the partitions A1 to A3.

Further, the power source control box 10 and the sub-power source control box 20 may include a control function unit such as ECU, and a communication device which does not demand for the supply of power may be connected to communicate with the control function unit in the power source control box 10 or the sub-power source control box 20 in the embodiments. In this case, for example, the above-described first device D1 and second device D2 include not only the power-demanding device but also the communication device. Thus, the power source control box 10 is connected to all the first devices D1 arranged in the same partition, supplies power to all the power-demanding devices among all the first devices D1, and inputs the signal from all the communication devices. The sub-power source control box 20 is also connected to all the second devices D2 arranged in the same partition, supplies power to all the power-demanding devices among all the second devices D2, and inputs the signal from all the communication devices.

Further, the trunk line TL may be formed with a part in which a connection part with respect to the first device D1 is formed such that the power may be supplied to the first device D1 through the connection part.

According to the present invention, it is possible to provide the wire harness which includes the common component while reducing the possibility of the short circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
a trunk line which serves as a transmission line of power from a vehicle battery;
a plurality of power source control boxes which are provided on the trunk line, arranged one by one in each of a plurality of partitions into which a vehicle is partitioned, and configured to distribute the power received through the trunk line to a power-demanding device that demands for supply of power;
a sub-power source control box provided in at least one partition of the plurality of partitions;
a first device that is a common part and is provided in the at least one partition;
a second device that is an optional part and is provided in the at least one partition; and
a branch wire that connects between the power source control box in the at least one partition and the sub-power source control box in the at least one partition, wherein
a plurality of power source control boxes each includes a connection unit for the branch wire,
the power source control box in the at least one partition is connected with all first device arranged in the at least one partition to supply power received through the trunk line to the all first device, and
the sub-power source control box in the at least one partition is connected with all second device arranged in the at least one partition to supply power received through the connection unit and the branch wire to the all second device.

2. The wire harness according to claim 1, wherein
the first device is a device mounted in all grades of a specific vehicle type, and
the second device is a device mounted in a grade higher than a lowest grade or mounted optionally.

3. The wire harness according to claim 1, wherein
the first device is a device mounted in all vehicle types in a same segment, and
the second device is a device mounted in any of the vehicle types in the same segment.

4. The wire harness according to claim 1, wherein
the first device is a device mounted in all vehicle types in a same platform of a same vehicle manufacturer, and
the second device is a device mounted in any of the vehicle types in the same platform of the same vehicle manufacturer.

5. The wire harness according to claim 1, wherein
the first device is a device mounted in all vehicle types of a same vehicle manufacturer, and
the second device is a device mounted in any of the vehicle types of the same vehicle manufacturer.

6. The wire harness according to claim 1, wherein
the first device is a device mounted in all vehicle types in a specific group when a plurality of platforms of a same vehicle manufacturer are grouped into two or more groups, and
the second device is a device mounted in any of the vehicle types in the specific group.

7. A wire harness comprising:
a trunk line which serves as a transmission line of power from a vehicle battery;
a plurality of power source control boxes which are provided on the trunk line, and arranged one by one in each of a plurality of partitions into which a vehicle is partitioned;
a sub-power source control box provided in at least one partition of the plurality of partitions; and
a branch wire that connects between the power source control box in the at least one partition and the sub-power source control box in the at least one partition, wherein
a plurality of power source control boxes each includes a connection unit for the branch wire,
in the at least one partition, the power source control box of the corresponding partition is connected with all first device out of a first device which is common and second device which is optional, arranged in the at least one partition to supply power received through the trunk line to all the first device, and the sub-power source control box in the at least one partition is connected with all second device arranged in the at least one partition to supply power received through the connection unit and the branch wire to the all second device.

\* \* \* \* \*